US007413114B2

(12) United States Patent
Miette et al.

(10) Patent No.: US 7,413,114 B2
(45) Date of Patent: Aug. 19, 2008

(54) METHOD OF HANDLING MAIL ITEMS WITH IMPROVED BAR-CODE READING

(75) Inventors: Emmanuel Miette, Saint-Gratien (FR); François Gillet, Lyons (FR)

(73) Assignee: Solystic, Gentilly (FR)

( * ) Notice: Subject to any disclaimer, the term of this patent is extended or adjusted under 35 U.S.C. 154(b) by 493 days.

(21) Appl. No.: 11/135,336

(22) Filed: May 24, 2005

(65) Prior Publication Data

US 2005/0269395 A1 Dec. 8, 2005

(30) Foreign Application Priority Data

May 25, 2004 (FR) .................................. 04 51025

(51) Int. Cl.
*G06F 17/00* (2006.01)

(52) U.S. Cl. ....................... 235/375; 235/454; 235/385; 209/548; 382/119; 705/60; 709/206

(58) Field of Classification Search ................. 235/375, 235/454, 385; 209/548; 382/119; 705/60; 709/206
See application file for complete search history.

(56) References Cited

U.S. PATENT DOCUMENTS 5,703,783 A * 12/1997 Allen et al. ................. 700/213
2002/0122569 A1 9/2002 Cofflet et al.
2003/0089643 A1* 5/2003 Forella et al. ............... 209/584
2005/0031164 A1* 2/2005 Fuhrmann et al. ........... 382/101
2005/0196014 A1* 9/2005 Vollmann ................... 382/101
2007/0007328 A1* 1/2007 Cole et al. .................. 235/375

FOREIGN PATENT DOCUMENTS

FR 2 841 673 A 1/2004

* cited by examiner

*Primary Examiner*—Michael G. Lee
*Assistant Examiner*—Allyson N Trail
(74) *Attorney, Agent, or Firm*—Sughrue Mion, PLLC

(57) ABSTRACT

In the method of handling mail items, while a mail item is on its first pass through the machine, the method consists in forming a digital image of the surface of the mail item, in deriving, from the image, a digital fingerprint characterizing the mail item, and in recording said digital fingerprint in a memory in correspondence with the bar code printed on the mail item. While the mail item is on its second pass through the machine, the method consists in reading the printed bar code that is printed on the mail item, and, if it has not been possible to extract completely the information contained in the printed code read off the mail item, in using said correspondence in the memory between the printed code that is printed on the mail item and the digital fingerprint that characterizes the mail item to continue machine-sorting the mail item, thereby contributing to reducing the error rate. The printed bar code that is printed on the mail item may be a mail item identity code, a customer applied identifier, or a sorting code for outward and/or inward sorting.

7 Claims, 5 Drawing Sheets

METHOD OF HANDLING MAIL ITEMS WITH IMPROVED BAR-CODE READING

The invention relates to a method of handling mail items in a sorting machine using a code that is printed on each mail item, the code being, for example, in the form of a two-dimensional matrix code of the machine-readable bar code type, it also being possible for the code to be a mail item identity code, a Customer Applied Identifier (CAI) code, or indeed an inward or an outward sorting code.

BACKGROUND OF THE INVENTION

In a conventional method of sorting mail items in a plurality of passes by using a mail item identity code, also known as an "ID tag", while the mail item is passing through the machine for the first time, a digital image is formed of the surface of the mail item that bears address information for performing an automatic address recognition operation by Optical Character Recognition (OCR), a mail item identity code is generated and that code is printed in the form of a bar code on the surface of the mail item. In a manner known per se, that code serves to retrieve sorting information from the database of the sorting machine in order to machine-sort each mail item during successive passes through the machine.

Such a bar code might not be read completely during the second pass of the mail item due to the bar code being printed with insufficient printing quality, or due to the particular type of the medium on which the bar code is printed. In particular, if the envelopes of the mail items are made of recycled paper (with a noisy or colored background), the symbols of the bar codes tend not to contrast very strongly with the background, and it is therefore possible that the bar code might be read incompletely. If the bar code cannot be read completely during a second sorting pass, the corresponding mail item must be removed (rejected) from the automatic sorting process because it is no longer possible to access the sorting information. As a result, the mail item must be sorted manually, which constitutes a time-consuming and costly process.

An automatic postal-sorting process is characterized by its error rate, which represents the quantity of mail items incorrectly handled by the automatic sorting process.

OBJECTS AND SUMMARY OF THE INVENTION

An object of the invention is to make an improvement contributing to reducing the error rate in a mail handling method in which provision is made to use two-dimensional codes printed on the mail items for the purpose of machine-sorting them.

To this end, the invention provides a method of handling mail items as defined above, wherein:

while a mail item is on its first pass through the machine, the method consists in forming a digital image of the mail item, in deriving, from the digital image, a digital fingerprint characterizing the mail item, and in recording said digital fingerprint in a memory in correspondence with the code printed on the mail item, and wherein while the mail item is on its second pass or on a subsequent pass through the machine, the method consists in reading the printed code that is printed on the mail item, and, if it has not been possible to extract completely the information contained in the printed code read off the mail item, in using said correspondence in the memory between the printed code that is printed on the mail item and the digital fingerprint that characterizes the mail item to continue machine-sorting the mail item.

With the method of the invention, it is possible easily to remedy errors in reading a bar code that encodes, for example: a mail item identity code or "ID Tag"; a Customer Applied Identifier or "CAI" as described in Patent Application WO01/74502; or indeed an inward or an outward sorting code used in the oldest postal sorting applications.

In a particular implementation of the method of the invention, the printed code that is printed on the mail item is stored in the memory in correspondence with the digital fingerprint that characterizes the mail item by storing all or some of the information encoded in the printed code amongst attributes of the recording of the digital fingerprint in the memory. Thus, a sort of reinforced digital fingerprint is obtained that is reinforced with information derived from the printed code that is printed on the mail item.

In a variant implementation of the method of the invention, while said mail item is on its second pass or on a subsequent pass through the machine, if it has not been possible to extract completely the information contained in the printed code that is read off the current mail item, the method consists:

in forming once again for the mail item a digital image of the surface of the mail item that bears the address information, and in deriving a current digital fingerprint from said image;

in reconstructing a set of candidate codes on the basis of the information extracted from the reading of the printed code on the current mail item;

in retrieving from the memory a set of candidate digital fingerprints recorded in correspondence with the candidate codes;

in comparing each candidate digital fingerprint with the current digital fingerprint, and, in the event that said current digital image matches a candidate digital fingerprint, in using the code that corresponds to it for the purpose of machine-sorting the mail item.

French Patent Application No. 2 841 673 describes a method of constituting a digital fingerprint from the image of the surface of a mail item as defined above, and of comparing two fingerprints to determine similarity between them. The contents of that patent application form an integral part of the present description.

The method of the invention can be implemented easily in an existing postal sorting installation. It has been observed that implementing the method of the invention can contribute to lowering the error rate to about 0.06%.

BRIEF DESCRIPTION OF THE DRAWINGS

An implementation of the method of the invention is described in more detail below and is illustrated by the drawings, in which.

MORE DETAILED DESCRIPTION

The method of the invention for sorting mail items is designed to be implemented in a postal sorting machine including a bar code reader system, for example, and a system organized to generate digital fingerprints (or image signatures) as described in French Patent Application No. 2 841 673.

In the method of the invention, while a mail item is on its first pass through the machine, a digital fingerprint referred to below as "Vid" and that characterizes the mail item is derived from the digital image formed for the mail item, and said digital fingerprint is recorded in a memory in correspondence with the two-dimensional code (in the case of bar code examples) printed on the mail item, so that while the mail item is on its second pass or on a subsequent pass through the machine, if the bar code cannot be read correctly, i.e. if it has not been possible for the information encoded in the bar code to be extracted completely, use is made of the correspondence stored in the memory between the bar code printed on the mail item and the digital fingerprint characterizing the mail item in order to retrieve the bar code completely and in order to continue machine-sorting the mail item.

As indicated above, the bar code can be a mail item identity code or "ID tag" that is generated and printed on the mail item while said item is on its first pass through the sorting machine. But the method of the invention may be extended by analogy to a "customer applied identifier" ("CAI") which is printed on the mail item by the sender (the customer), or else to a sorting code that is generated and printed on the mail item while it is on its first pass through the machine.

Figure 1:
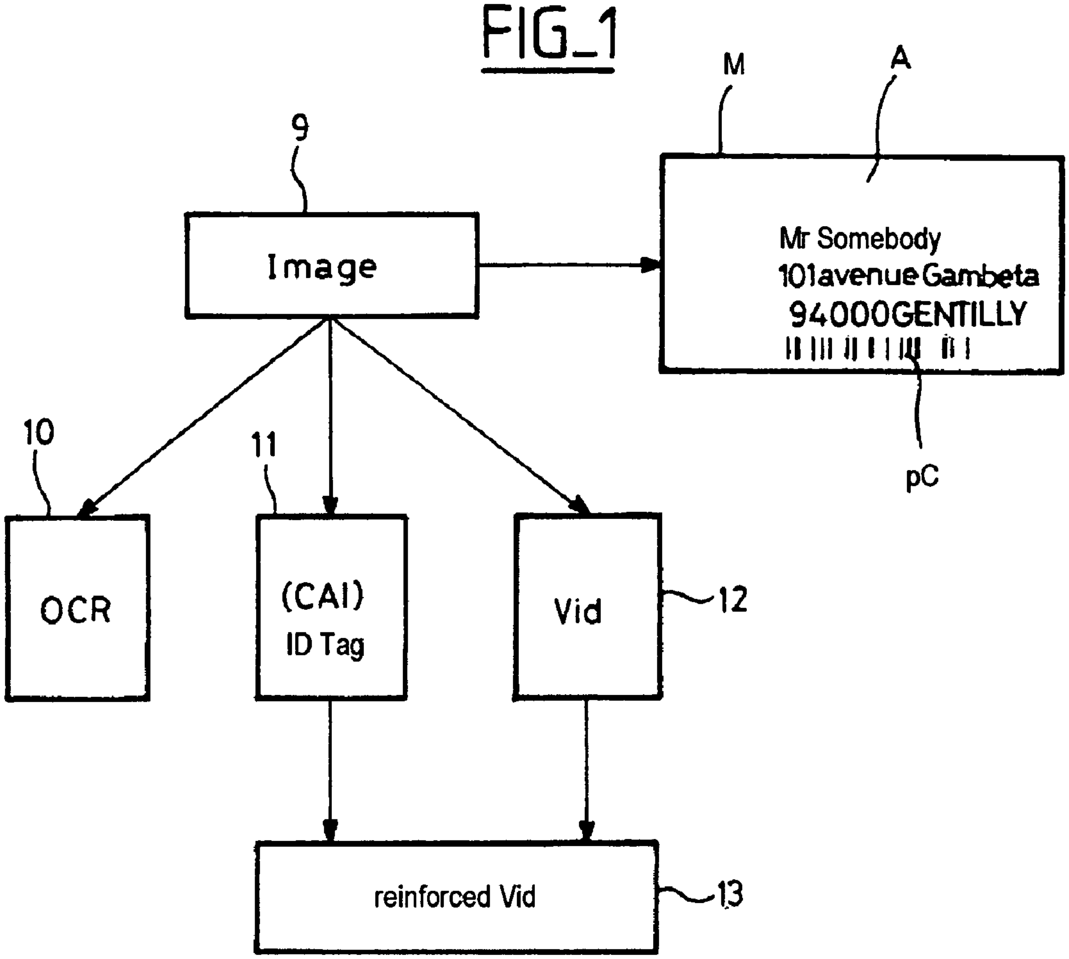
FIG. 1 is a flow chart showing a first implementation of a method of the invention while a mail item is on its first pass through the sorting machine, the printed bar code being an ID tag in this implementation, or, in a variant, a customer applied identifier.

FIG. 1 shows the various steps of a first implementation of a mail-handling method of the invention while a mail item M is on its first pass through the sorting machine and when the bar code printed on the surface of the mail item is an identity code that serves as a logic address for retrieving sorting information from a memory.

At 9, a digital image is formed of the surface of the mail item M that bears the address information A for the purpose of performing an automatic address recognition operation by OCR. The result of the operation 10 makes it possible to extract sorting information. In parallel, before or after the digital image is formed at 9, an identity code indicated by "ID tag" in the figures is generated in the machine in step 11, which code or tag is to be printed in the form of a bar code (also referred to as a "printed code" ("pC")) on the mail item. The bar code pC can encode various kinds of information such as, for example, the reference of the postal operator, the identity of the sorting machine assigned the task of printing the identity code, the date, the time, the sequence number of the mail item in the given time, etc. The bar code pC or ID Tag printed by the machine is recorded in a memory of the sorting machine in correspondence with the sorting information or attributes so that said information or attributes can be retrieved subsequently as is well known.

In step 12, a digital fingerprint Vid of the surface of the mail item that bears the delivery address A is derived from the digital image formed in step 9, and, in step 13, the digital fingerprint Vid characterizing said mail item is recorded in a memory of the sorting machine in correspondence with the identity bar code ID tag (pC). More particularly, in accordance with the invention, putting into correspondence consists in adding additional attributes to the attributes of the recording of the digital fingerprint Vid in the memory, which additional attributes are constituted by some or all of the information encoded in the identity bar code (pC). A sort of reinforced digital fingerprint is thus obtained.

Figure 2:
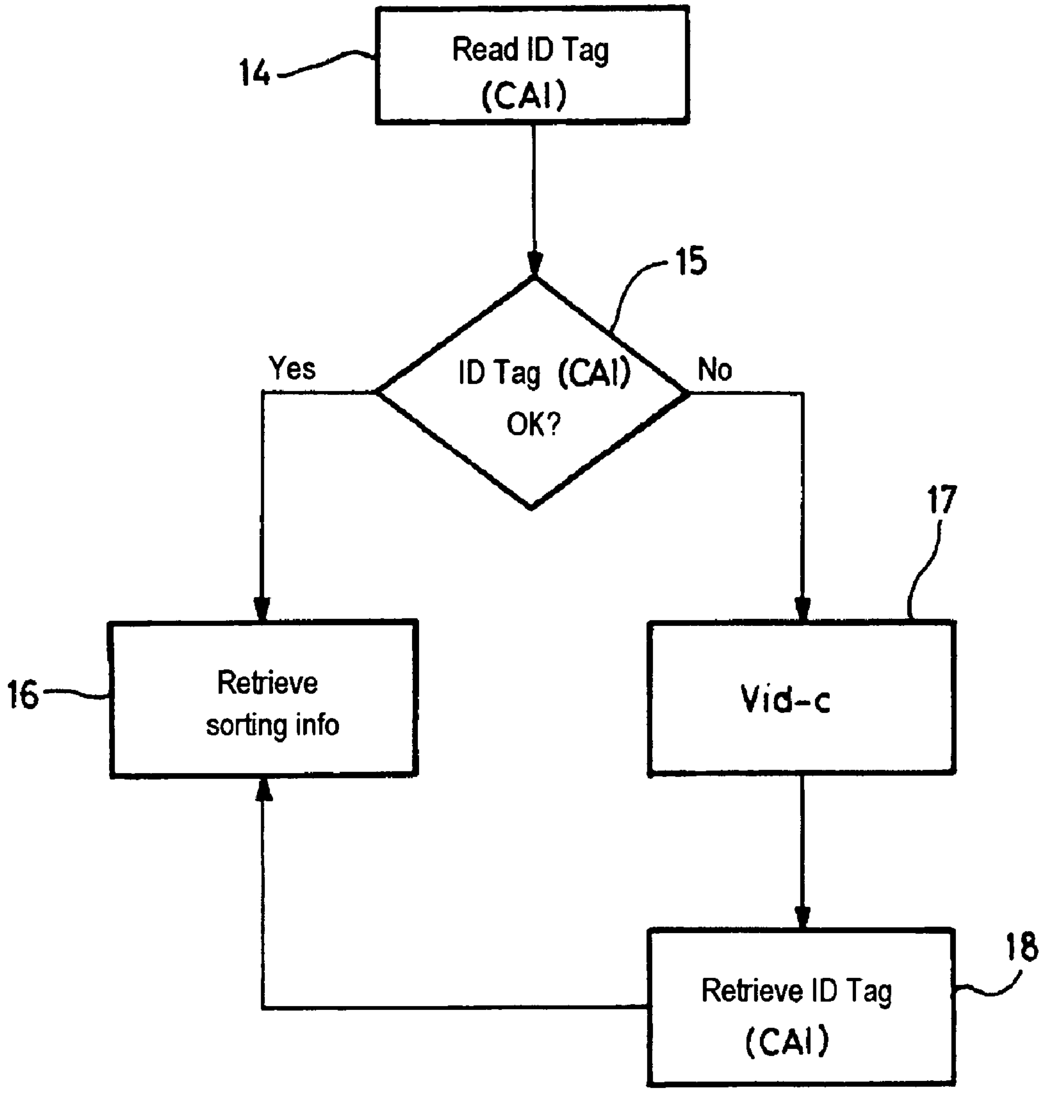
FIG. 2 is a flow chart showing a first implementation of a method of the invention while a mail item is on its second pass or on a subsequent pass through the sorting machine, the printed bar code being an ID tag in this implementation, or, in a variant, a customer applied identifier.

As shown in FIG. 2, while the mail item M is on its second pass or on a subsequent pass through the machine, the identity bar code ID Tag (pC) is machine read at 14. In step 15, if the identity code can be read completely, it is used directly to retrieve the sorting information at 16, as is well known.

In the step 15, if the identity bar code cannot be read completely, i.e. if the information contained in the bar code cannot be extracted therefrom completely, a digital image of the surface of the current mail item that bears the address information A is formed at 17, and a current fingerprint (Vid-c) is derived from that image. Then, at 18, a search is performed amongst the digital fingerprints Vid recorded in the memory at step 13 to find those fingerprints which have additional attributes corresponding to the information extracted from the partial reading of the bar code in step 14, and in addition, the fingerprints Vid found are compared with the current fingerprint Vid-c in order to detect similarity. This second comparison is performed on the local and overall attributes of the fingerprints as described in Patent Application No. 2 841 673.

On the basis of the identity of an fingerprint Vid, an ID tag is retrieved by correspondence or from the attributes of the fingerprint, thereby making it possible to retrieve the sorting information for the mail item M and thus to continue machine-sorting said mail item.

It should be noted that the step 17 resulting in identifying an fingerprint by comparison with the current fingerprint Vid and in then retrieving the corresponding identity code could be implemented between the steps 15 and 16 redundantly for the purpose of additionally checking that the bar code is read properly, i.e. even if it has been read completely, in order to reduce the error rate further.

The principle of the method of the invention that is described above for an identification code ID Tag with reference to FIGS. 1 and 2 also applies for a customer applied identifier, as indicated by "CAI" in parentheses in those figures.

The CAI is printed by the customer, e.g. in the form of a bar code pC, on the surface of the mail item. It serves to retrieve sorting information (or else address information) from an address file compiled and supplied by the customer.

Returning to FIG. 1, at step 9, while a mail item M is on its first pass through the machine, a digital image is formed of the surface of the mail item that bears the address information A and also the CAI. In this use related to the customer applied identifier, the OCR automatic address recognition step 10 is not performed because the address (or sorting) information is already recorded in the customer file as indicated above.

At 11, the CAI printed on the mail item in the form of the bar code pC is machine read. At 12, a digital fingerprint Vid of the surface of the mail item is derived from the digital image formed in step 9, and, in the step 13, the digital fingerprint Vid characterizing the mail item is recorded in a memory of the machine in correspondence with the customer applied identifier CAI. The digital fingerprint Vid can be reinforced with all or some of the CAI as indicated above for the ID tag.

Returning to FIG. 2, while the mail item P is on a second pass or on a subsequent pass through the machine, the bar code (CAI) printed on the mail item is machine read at 14. In step 15, if the bar code pC can be read completely, it is used directly to retrieve, at 16, the address (or sorting) information from the customer file, as is known.

In step 15, if the bar code pC cannot be read completely, a digital image of the surface of the current mail item is formed at 17, and a current fingerprint Vid-c is derived from said digital image. At 18, a search is performed amongst the digital fingerprints Vid recorded in the memory in step 13 to find that digital fingerprint which is similar to the current fingerprint Vid-c. On the basis of the identity of a digital fingerprint Vid, the CAI is retrieved, which makes it possible to retrieve the address (or sorting) information from the customer address file and thus to continue machine-sorting the mail item.

Figure 3:
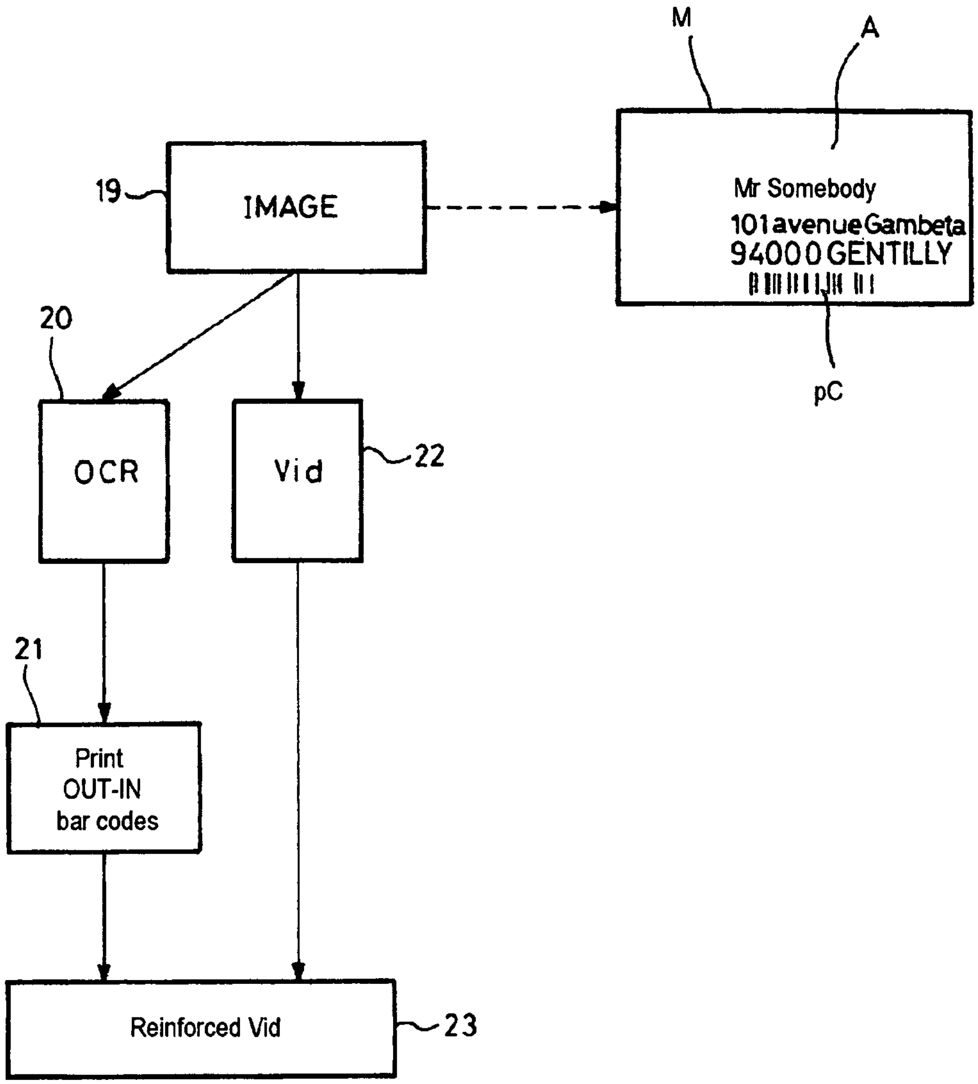
FIG. 3 is a flow chart showing a second implementation of a method of the invention while a mail item is on its first pass through the sorting machine, the printed bar code being an inward or an outward sorting code in this implementation.

FIG. 3 shows the various steps of a second embodiment of the mail handling method for a bar code that encodes an inward or an outward sorting code.

While the mail item M is on its first pass through the machine, a digital image 1 of the surface of the mail item M that bears the address information A is formed at 19 in order to perform an automatic address recognition operation by OCR. A sorting bar code, e.g. encoding outward sorting information indicated by OUT or inward sorting information indicated by IN, resulting from the operation 20 is printed by the sorting machine on the mail item in step 21. In step 22, a digital fingerprint Vid is derived from the digital image formed in step 19 as described above, and, in step 23, the digital fingerprint Vid characterizing said mail item is recorded in a memory of the sorting machine, and some or all of the information encoded in the sorting bar code is added to the additional attributes of the recording of the digital fingerprint in the memory.

Figure 4:
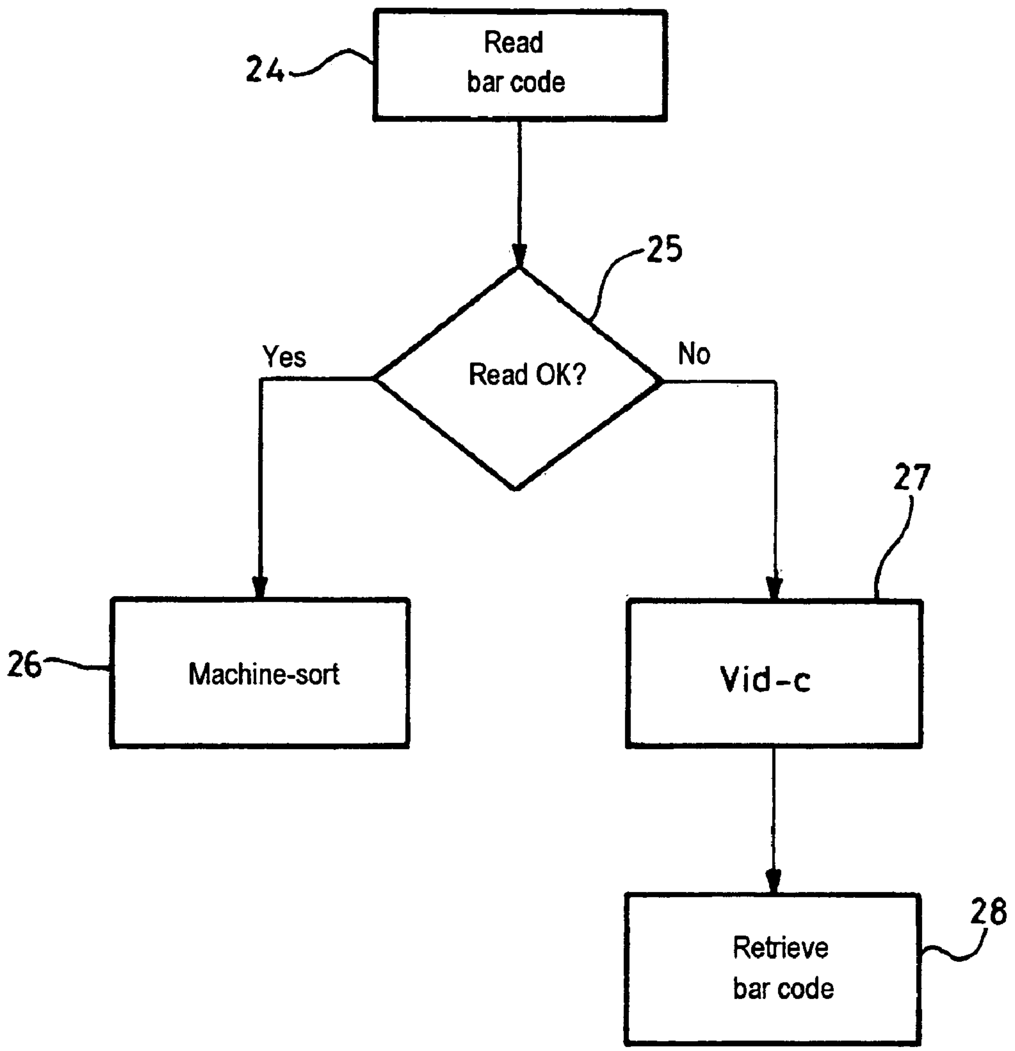
FIG. 4 is a flow-chart showing a second implementation of a method of the invention while a mail item is on its second pass or on a subsequent pass through the sorting machine, the printed bar code being an inward or an outward sorting code in this implementation.

In FIG. 4, while a mail item is on its second pass or on a subsequent pass through the sorting machine, the sorting bar code printed on the mail item is read at 24. If the sorting bar code can be read completely (step 25), it is used conventionally to continue the machine sorting at 26. If the sorting bar code cannot be read completely at 25, then, an image of the surface of the mail item is formed at 27, and a current fingerprint Vid-c of the surface of the mail item is derived from that current image. At 28, a digital fingerprint Vid is identified as in step 18 in FIG. 2 for the purpose of retrieving a sorting bar code which serves for continuing the machine sorting.

Figure 5:
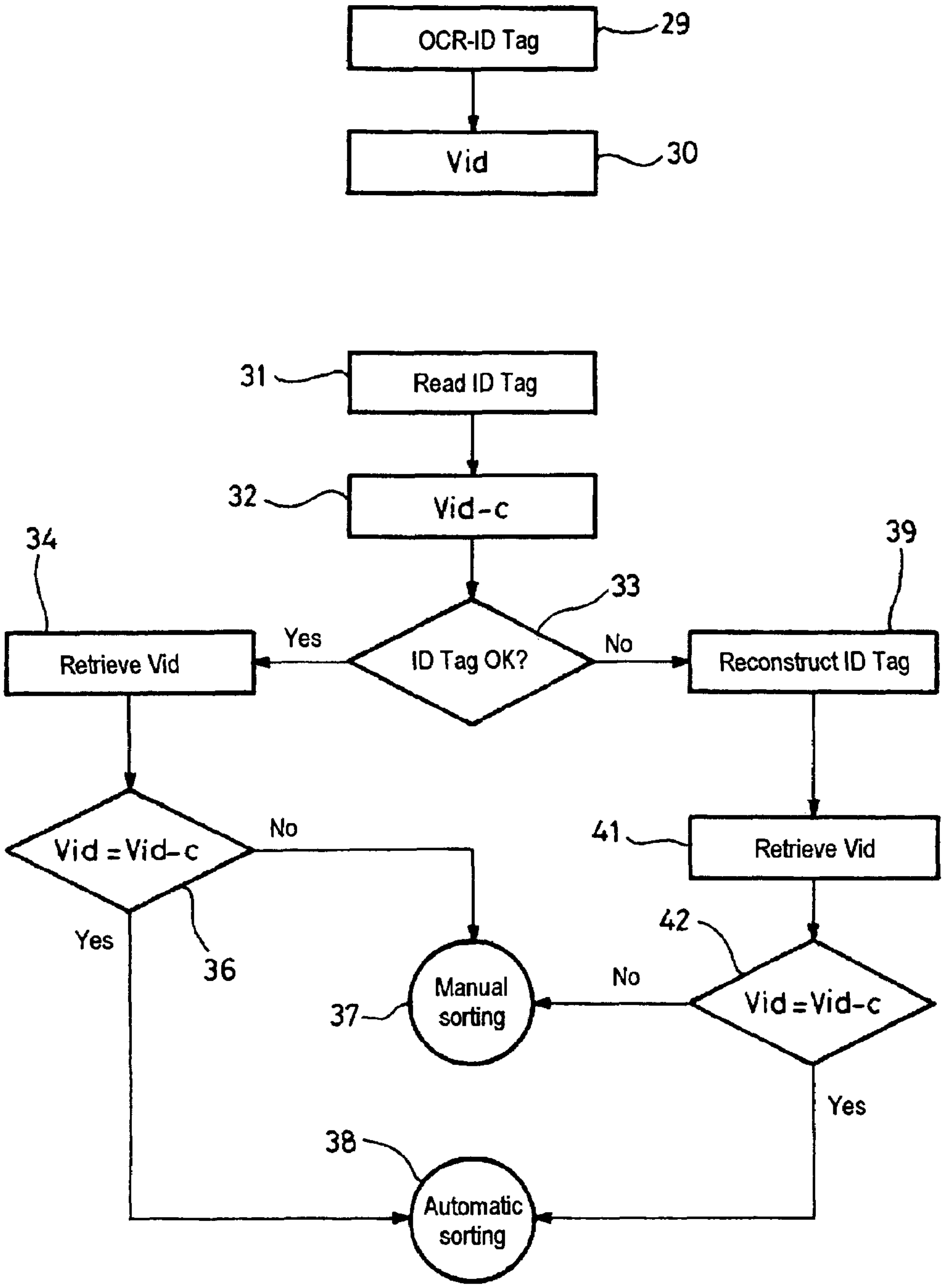
FIG. 5 is a flow chart showing the steps of a third implementation of a method of the invention for sorting mail items.

FIG. 5 is a simplified flow chart showing a variant implementation of the method of the invention with an identity bar code being read.

While a mail item is on its first pass through the machine, a digital image of the surface of the mail item M that bears the address information A is formed in order to perform an automatic address recognition operation by OCR. In parallel, an ID Tag is generated for the mail item M, and the pieces of sorting data (attributes) that represent the result of the OCR automatic recognition result are recorded in a memory in correspondence with he ID Tag which is printed in the form of a bar code pC on the surface of the mail item. In step 30, a digital fingerprint Vid is derived from the digital image, and the digital fingerprint is recorded in a memory in correspondence with ID Tag.

While the mail item M is on its second pass through the machine, or while it is being handled subsequently by the same sorting machine or by another sorting machine, the bar code pC printed on the mail item is machine-read at 31 for the purpose of retrieving the ID Tag, a digital image of the current mail item is formed at 32, and a current digital fingerprint Vid-c is derived from that image.

In step 33, if the information contained in the identity bar code pC can be extracted completely, the identity bar code is checked in step 34 and in the following steps as explained with reference to the first implementation of the method of the invention. In particular, in step 34, on the basis of the identity code read completely at 31, the digital fingerprint that corresponds to it is retrieved, and, at 36, that digital fingerprint Vid is compared with the current digital fingerprint Vid-c formed in step 32 in order to verify that the two digital fingerprints match. If matching is not detected at 36, the mail item is removed from the automatic handling process so as to be handled manually at 37. Otherwise, if matching is detected, the automatic handling process continues at 38 after retrieving the sorting data by means of the identity bar code.

However, if, in step 33, the identity bar code pC cannot be read back completely, then a set of candidate bar codes is reconstructed at 39. The list of bar codes can be generated by accepting a higher probability of error on reading the bar codes at 31 or by generating all of the possible combinations for the information portion that is not readable at 31. Then, in step 41, the fingerprints Vid corresponding respectively to the candidate bar codes obtained in step 39 are retrieved from the memory. In particular in step 41, and in the same way as indicated above, the overall, local, and additional attributes of the current fingerprint are compared with those of each of the fingerprints corresponding to each candidate bar code. If no matching is detected at 42, the corresponding mail item is removed at 37 from the automatic handling process. Otherwise, if matching is detected, the automatic handling process continues at 38 after retrieving the identity bar code and thus the sorting data.

The mail handling method as described above can also be applied to a customer applied identifier or indeed to an inward or an outward sorting code, and it can be implemented in existing sorting machines.

What is claimed is:

1. A method of handling mail items in a sorting machine using a code that is printed on each mail item and that is machine-readable, wherein:

while a mail item is on its first pass through the machine, the method comprises forming a digital image of the mail item, deriving, from the digital image, a digital fingerprint characterizing the mail item, and recording said digital fingerprint in a memory in correspondence with the code printed on the mail item, and wherein while the mail item is on its second pass or on a subsequent pass through the machine, the method comprises reading the printed code that is printed on the mail item, and, if completely extracting the information contained in the printed code read off the mail item is not possible, using said correspondence in the memory between the printed code that is printed on the mail item and the digital fingerprint that characterizes the mail item to continue machine-sorting the mail item.

2. A method according to claim 1, in which the printed code that is printed on the mail item is stored in the memory in correspondence with the digital fingerprint that characterizes the mail item by storing all or some of the information encoded in the printed code in attributes of the recording of the digital fingerprint in the memory.

3. A method according to claim 1, in which, while said mail item is on its second pass or on a subsequent pass through the machine, if it is not possible to extract completely the information contained in the printed code that is read off the current mail item, the method comprises:

forming once again for the mail item, a digital image of the surface of the mail item that bears address information, and deriving a current digital fingerprint from said image;

reconstructing a set of candidate codes on the basis of the information extracted from the reading of the printed code on the current mail item;

retrieving from the memory a set of candidate digital fingerprints recorded in correspondence with the candidate codes;

comparing each candidate digital fingerprint with the current digital fingerprint, and, in an event that said current digital image matches a candidate digital fingerprint, using the code that corresponds to the candidate digital fingerprint for the purpose of machine-sorting the mail item.

4. A method according to claim 1 , in which the printed code is a mail item identity code.

5. A method according to claim 1, in which the printed code is a mail item identity code.

6. A method according to claim 1, in which the printed code is a “customer applied identifier” (CAI) printed by a sender of said mail item.

7. A machine for sorting mail items, being organized to implement the method of claim 1.

* * * * *